United States Patent
Shemer et al.

(10) Patent No.: US 12,327,147 B2
(45) Date of Patent: Jun. 10, 2025

(54) STANDBY DATA CENTER AS A SERVICE

(71) Applicant: EMC IP Holding Company LLC, Hopkinton, MA (US)

(72) Inventors: Jehuda Shemer, Kfar Saba (IL); Valerie Lotosh, Ramat-Gan (IL); Erez Sharvit, Ramat-Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 878 days.

(21) Appl. No.: 17/507,664

(22) Filed: Oct. 21, 2021

(65) Prior Publication Data

US 2023/0127061 A1 Apr. 27, 2023

(51) Int. Cl.
*G06F 9/50* (2006.01)
*G06F 9/455* (2018.01)

(52) U.S. Cl.
CPC ........ *G06F 9/5088* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| 8,966,475 | B2 | 2/2015 | Srinivasan |
| 11,875,191 | B1 | 1/2024 | Plenderleith et al. |
| 2003/0028729 | A1 | 2/2003 | Yamamoto et al. |
| 2003/0126327 | A1 | 7/2003 | Pesola et al. |
| 2005/0193245 | A1 | 9/2005 | Hayden et al. |
| 2009/0172816 | A1 | 7/2009 | Maino et al. |
| 2010/0049823 | A1 | 2/2010 | Saigo et al. |
| 2012/0192006 | A1 | 7/2012 | Qi et al. |
| 2014/0215272 | A1 | 7/2014 | Bauer et al. |
| 2015/0074447 | A1 | 3/2015 | Park et al. |
| 2015/0169417 | A1 | 6/2015 | Brandwine et al. |
| 2015/0331753 | A1 | 11/2015 | Nakajima et al. |
| 2015/0347221 | A1 | 12/2015 | Anderson et al. |
| 2016/0062858 | A1 | 3/2016 | Gallagher et al. |

(Continued)

OTHER PUBLICATIONS

Office Action mailed Aug. 3, 2023 for U.S. Appl. No. 17/507,661, 52 pages.

(Continued)

*Primary Examiner* — Eric C Wai
(74) *Attorney, Agent, or Firm* — Amin, Turocy & Watson, LLP

(57) ABSTRACT

A system can maintain a first data center that comprises a virtualized overlay network and virtualized volume identifiers, and store data comprising virtualized workloads. The system can determine a service level agreement associated with providing a second data center as a backup to the first data center. The system can, based on the service level agreement, divide, into a first portion of tasks and a second portion of tasks deploying the data to a secondary storage of the second data center, deploying the data to a primary storage of the second data center, and configuring the second data center with the virtualized overlay network and the virtualized volume identifiers. The system can perform the first portion of tasks before determining to restore the first data center to the second data center. The system can perform the second portion of tasks in response to determining to restore the first data center.

20 Claims, 12 Drawing Sheets

(56) References Cited

U.S. PATENT DOCUMENTS

| | | |
|---|---|---|
| 2016/0119202 A1 | 4/2016 | Iyer et al. |
| 2017/0242758 A1 | 8/2017 | Chou et al. |
| 2018/0365117 A1* | 12/2018 | Basham .............. G06F 11/2094 |
| 2019/0163763 A1 | 5/2019 | Pandey et al. |
| 2019/0243725 A1 | 8/2019 | Bade et al. |
| 2020/0409803 A1* | 12/2020 | Naidu ................... G06F 3/0664 |
| 2021/0281642 A1 | 9/2021 | Padiyar et al. |
| 2021/0342237 A1 | 11/2021 | Polimera et al. |
| 2022/0229685 A1 | 7/2022 | Helvey et al. |
| 2023/0125085 A1 | 4/2023 | Shemer et al. |
| 2023/0128370 A1 | 4/2023 | Shemer et al. |
| 2023/0130897 A1 | 4/2023 | Shemer et al. |

OTHER PUBLICATIONS

Notice of Allowance mailed Feb. 8, 2024 for U.S. Appl. No. 17/507,661, 46 pages.
Office Action mailed Jun. 4, 2024 for U.S. Appl. No. 17/507,656, 25 pages.
Notice of Allowance mailed Sep. 12, 2024 for U.S. Appl. No. 17/507,656, 25 pages.
Office Action mailed Dec. 4, 2024 for U.S. Appl. No. 17/507,672, 37 pages.

\* cited by examiner

900

(902)

↓

MAINTAINING A FIRST DATA CENTER THAT COMPRISES A FIRST INSTANCE OF A VIRTUALIZED OVERLAY NETWORK THAT VIRTUALIZES PHYSICAL NETWORK RESOURCES AND A FIRST INSTANCE OF A GROUP OF VIRTUALIZED VOLUME IDENTIFIERS THAT VIRTUALIZE PHYSICAL STORAGE VOLUMES, THE FIRST DATA CENTER STORING DATA COMPRISING FIRST INSTANCES OF A GROUP OF VIRTUALIZED WORKLOADS THAT OPERATE ON THE FIRST DATA CENTER 904

↓

DETERMINING A SERVICE LEVEL AGREEMENT ASSOCIATED WITH PROVIDING A SECOND DATA CENTER AS A BACKUP TO THE FIRST DATA CENTER 906

↓

BASED ON THE SERVICE LEVEL AGREEMENT, DIVIDING, INTO A FIRST PORTION OF TASKS AND A SECOND PORTION OF TASKS:
DEPLOYING THE DATA TO A SECONDARY STORAGE OF THE SECOND DATA CENTER,
DEPLOYING THE DATA TO A PRIMARY STORAGE OF THE SECOND DATA CENTER, AND
CONFIGURING THE SECOND DATA CENTER WITH A SECOND INSTANCE OF THE VIRTUALIZED OVERLAY NETWORK AND A SECOND INSTANCE OF THE GROUP OF VIRTUALIZED VOLUME IDENTIFIERS 908

↓

PERFORMING THE FIRST PORTION OF TASKS BEFORE DETERMINING TO RESTORE THE FIRST DATA CENTER TO THE SECOND DATA CENTER 910

↓

PERFORMING THE SECOND PORTION OF TASKS IN RESPONSE TO DETERMINING TO RESTORE THE FIRST DATA CENTER TO THE SECOND DATA CENTER 912

```
        ( 1002 )
           │
           ▼
MAINTAINING A FIRST DATA CENTER THAT COMPRISES A FIRST INSTANCE OF A VIRTUALIZED OVERLAY NETWORK
THAT ABSTRACTS PHYSICAL NETWORK RESOURCES AND A FIRST INSTANCE OF A GROUP OF VIRTUALIZED VOLUME
IDENTIFIERS THAT ABSTRACT PHYSICAL STORAGE VOLUMES, THE FIRST DATA CENTER STORING DATA
COMPRISING FIRST INSTANCES OF A GROUP OF VIRTUALIZED WORKLOADS THAT OPERATE ON THE FIRST DATA
CENTER 1004
           │
           ▼
DETERMINING A SERVICE LEVEL AGREEMENT ASSOCIATED WITH PROVIDING
A SECOND DATA CENTER AS A BACKUP TO THE FIRST DATA CENTER 1006
           │
           ▼
BASED ON THE SERVICE LEVEL AGREEMENT, MAKING A FIRST DETERMINATION OF WHETHER TO
PERFORM DEPLOYING THE DATA TO A STORAGE OF THE SECOND DATA CENTER BEFORE OR AFTER
DETERMINING TO RESTORE THE FIRST DATA CENTER TO THE SECOND DATA CENTER 1008
           │
           ▼
BASED ON THE SERVICE LEVEL AGREEMENT, MAKING A SECOND DETERMINATION OF WHETHER TO PERFORM
CONFIGURING THE SECOND DATA CENTER WITH A SECOND INSTANCE OF THE VIRTUALIZED OVERLAY NETWORK
AND A SECOND INSTANCE OF THE GROUP OF VIRTUALIZED VOLUME IDENTIFIERS BEFORE OR AFTER DETERMINING
TO RESTORE THE FIRST DATA CENTER TO THE SECOND DATA CENTER 1010
           │
           ▼
DEPLOYING THE DATA TO THE STORAGE OF THE SECOND DATA CENTER BEFORE OR AFTER
DETERMINING TO RESTORE THE FIRST DATA CENTER TO THE SECOND DATA CENTER
BASED ON THE FIRST DETERMINATION 1012
           │
           ▼
CONFIGURING THE SECOND DATA CENTER WITH THE SECOND INSTANCE OF THE
VIRTUALIZED OVERLAY NETWORK AND THE SECOND INSTANCE OF THE GROUP OF
VIRTUALIZED VOLUME IDENTIFIERS BASED ON THE SECOND DETERMINATION 1014
           │
           ▼
        ( 1016 )
```

DETERMINING A SERVICE LEVEL AGREEMENT ASSOCIATED WITH PROVIDING A SECOND DATA CENTER AS A BACKUP TO A FIRST DATA CENTER, WHEREIN THE FIRST DATA CENTER COMPRISES A FIRST INSTANCE OF A VIRTUALIZED OVERLAY AND A FIRST INSTANCE OF A GROUP OF VIRTUALIZED VOLUME IDENTIFIERS THAT ABSTRACT PHYSICAL STORAGE VOLUMES 1104

BASED ON THE SERVICE LEVEL AGREEMENT, DETERMINING WHETHER TO PRE-DEPLOY AT LEAST PART OF THE SECOND DATA CENTER, WHEREIN PRE-DEPLOYING THE SECOND DATA CENTER COMPRISES PRE-DEPLOYING DATA OF THE FIRST DATA CENTER TO A STORAGE OF THE SECOND DATA CENTER AND CONFIGURING THE SECOND DATA CENTER WITH A SECOND INSTANCE OF THE VIRTUALIZED OVERLAY NETWORK AND A SECOND INSTANCE OF THE GROUP OF VIRTUALIZED VOLUME IDENTIFIERS 1106

PRE-DEPLOYING THE SECOND DATA CENTER BASED ON THE DETERMINING INDICATING TO PRE-DEPLOY AT LEAST THE PART OF THE SECOND DATA CENTER 1108

AFTER DETERMINING TO RESTORE THE FIRST DATA CENTER TO THE SECOND DATA CENTER, PERFORMING A REMAINDER OF DEPLOYING THE SECOND DATA CENTER REMAINING AFTER AT LEAST THE PART OF THE SECOND DATA CENTER WAS PRE-DEPLOYED 1110

FIG. 11

STANDBY DATA CENTER AS A SERVICE

BACKGROUND

A data center can comprise a plurality of computers that are configured to store and/or operate on data. Managing a data center can comprise various operations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a first data center that comprises a first instance of a virtualized overlay network that virtualizes physical network resources and a first instance of a group of virtualized volume identifiers that virtualize physical storage volumes, the first data center storing data comprising first instances of a group of virtualized workloads that operate on the first data center. The system can determine a service level agreement associated with providing a second data center as a backup to the first data center. The system can, based on the service level agreement, divide, into a first portion of tasks and a second portion of tasks deploying the data to a secondary storage of the second data center, deploying the data to a primary storage of the second data center, and configuring the second data center with a second instance of the virtualized overlay network and a second instance of the group of virtualized volume identifiers. The system can perform the first portion of tasks before determining to restore the first data center to the second data center. The system can perform the second portion of tasks in response to determining to restore the first data center to the second data center.

An example method can comprise maintaining, by a system comprising a processor, a first data center that comprises a first instance of a virtualized overlay network that abstracts physical network resources and a first instance of a group of virtualized volume identifiers that abstract physical storage volumes, the first data center storing data comprising first instances of a group of virtualized workloads that operate on the first data center. The method can further comprise determining, by the system, a service level agreement associated with providing a second data center as a backup to the first data center. The method can further comprise based on the service level agreement, making, by the system, a first determination of whether to perform deploying the data to a storage of the second data center before or after determining to restore the first data center to the second data center. The method can further comprise based on the service level agreement, making, by the system, a second determination of whether to perform configuring the second data center with a second instance of the virtualized overlay network and a second instance of the group of virtualized volume identifiers before or after determining to restore the first data center to the second data center. The method can further comprise deploying, by the system, the data to the storage of the second data center before or after determining to restore the first data center to the second data center based on the first determination. The method can further comprise configuring, by the system, the second data center with the second instance of the virtualized overlay network and the second instance of the group of virtualized volume identifiers based on the second determination.

An example non-transitory computer-readable medium can comprise instructions that, in response to execution, cause a system comprising a processor to perform operations. The operations can comprise determining a service level agreement associated with providing a second data center as a backup to a first data center, wherein the first data center comprises a first instance of a virtualized overlay and a first instance of a group of virtualized volume identifiers that abstract physical storage volumes. The operations can further comprise, based on the service level agreement, determining whether to pre-deploy at least part of the second data center, wherein pre-deploying the second data center comprises pre-deploying data of the first data center to a storage of the second data center and configuring the second data center with a second instance of the virtualized overlay network and a second instance of the group of virtualized volume identifiers. The operations can further comprise, pre-deploying the second data center based on the determining indicating to pre-deploy at least the part of the second data center. The operations can further comprise, after determining to restore the first data center to the second data center, performing a remainder of deploying the second data center remaining after at least the part of the second data center was pre-deployed.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates an example process flow that can facilitate a standby data center as a service, in accordance with an embodiment of this disclosure;

FIG. 10 illustrates another example process flow that can facilitate a standby data center as a service, in accordance with an embodiment of this disclosure;

FIG. 11 illustrates another example process flow that can facilitate a standby data center as a service, in accordance with an embodiment of this disclosure;

DETAILED DESCRIPTION

Example Architectures

Figure 1:
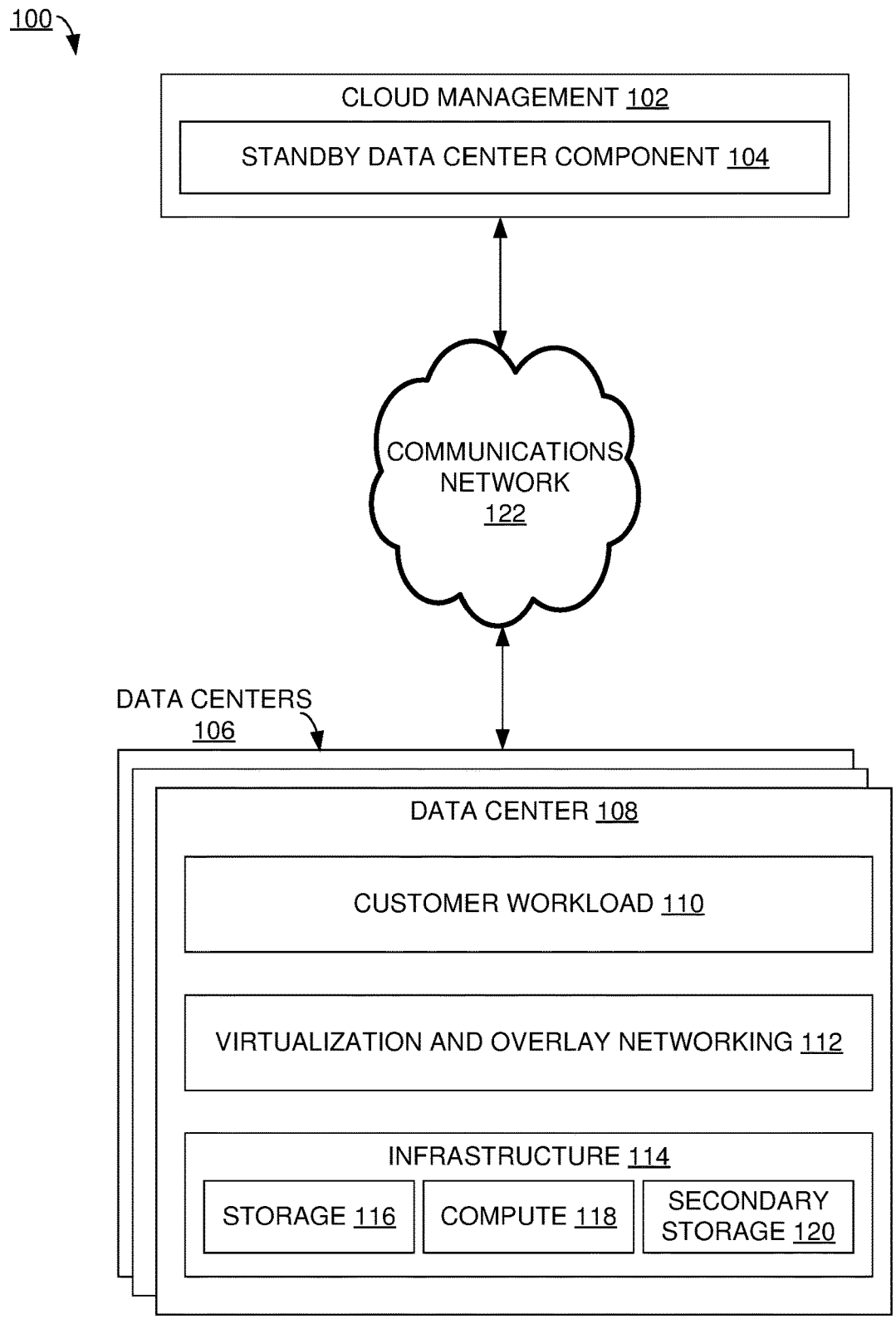
FIG. 1 illustrates an example system architecture that can facilitate a standby data center as a service, in accordance with an embodiment of this disclosure.

FIG. 1 illustrates an example system architecture 100 that can facilitate a standby data center as a service, in accordance with an embodiment of this disclosure.

System architecture 100 can facilitate deployment and management of infrastructure at customer premise or hosted locations. System architecture 100 can facilitate consuming infrastructure as a service. System architecture 100 generally targets full data center deployments (e.g., data centers 106, in an architecture that can be referred to as data centers as a service (DCaaS)). System architecture 100 can comprise data centers that run virtual infrastructure (e.g., customer workload 110 operating on top of virtualization and overlay networking 112) and can facilitate data protection and mobility use of those data centers.

A data center (e.g., data center 108) in system architecture 100 can comprise compute (e.g., compute 118), storage (e.g., storage 116), and networking, and which has a virtualization layer (e.g., virtualization and overlay networking 112). That is, system architecture 100 can deploy a data center that can run infrastructure as a service (IaaS) workloads. Where system architecture 100 deploys infrastructure as a service, this can be referred to as IaaS as a service (IaaSaaS).

System architecture 100 can differ from other cloud offerings. Some other cloud offerings support creating extensions of themselves, which can be hosted in other locations. In the example of system architecture 100, cloud management 102 can be used to orchestrate and manage a completely independent customer data center (e.g., data center 108). The manner in which technologies are used, and the way that layers (e.g., infrastructure 114 and virtualization and overlay networking 112) can be decomposed in system architecture 100 can differ from that of other cloud offerings.

That is, in other cloud offerings, such as public clouds (where workloads for multiple customers are run on the same hardware and/or in the same data center), hardware resources can generally be shared between tenants (e.g., customers). This can lead to security concerns because one customer can be sharing hardware with a rival entity (e.g., two competing consumer packaged goods companies) or a malicious actor. A security hole or data leak can cause immediate damage. In contrast, with system architecture 100, a small deployment can be created that is dedicated to a customer and data can be stored on customer premises or stored in a dedicated area for the customer.

In other cloud offerings, management can be optimized for a small number of large hardware locations. Other cloud offerings can rely on uniformity and consistency of hardware and access in order to optimize their maintenance. In contrast, system architecture 100 can be used to manage a larger number of customer locations, each with a relatively small deployment. With system architecture 100, there can be differences in hardware between customer locations according to an age and/or version of deployment, or according to a price or service level agreement designation. The management issues associated with these two types of architectures can be different.

Cloud extensions can be additional hardware from a same cloud region located in a different physical place. In system architecture 100, each location can be a separate instance, which can be connected and/or extended by utilizing the present techniques.

System architecture 100 can be utilized to connect to existing customer data center components, whereas with other cloud offerings this can constitute a security violation.

System architecture 100 can be implemented to deploy or utilize hardware of a wide range of profiles and capabilities. This hardware can include one or more servers (e.g., compute 118) with a central processing unit, memory, local storage, and peripheral devices; one or more primary storage systems (e.g., storage 116, where primary storage can generally be optimized for performance (e.g., provide a low latency for reads and writes), and be used for running an organization's main applications and workloads); network switches and devices (e.g., network and/or a storage area network (SAN); and/or additional hardware for secondary storages (e.g., secondary storage 120, where, in contrast to primary storage, secondary storage can generally be optimized for long term reliability and capacity, and used for backup and data protection systems) or other services. This hardware can also include object storage, file systems, network attached storage (NAS), hardware for performance acceleration (e.g., graphics processing units (GPUs), cache cards, central processing unit (CPU) offload cards, smart network interface cards (NICs), etc.), and/or specialized servers or other hardware for specific purposes like stream servers, messaging, artificial intelligence (AI), image processing and/or security.

In some examples, this hardware can be configured and wired by an entity that manages cloud management 102, and on behalf of a customer that possesses data center 108. The hardware can be delivered to data center 108, or can be hosted by the entity that manages cloud management 102, or by a third party. In some examples, in hosting sites, general hardware can already be available at the time of a customer order, and be allocated to a customer upon a service request.

In addition to hardware, multiple software components can be deployed and managed in accordance with customer requests.

Cloud management 102 can comprise a cloud portal that provides a purchasing and management user interface, and that facilitates ordering hardware resources; managing resource usage; monitoring and error handling; and upgrade and life cycle.

Cloud management 102 can store customer-related information and details pertaining to customer infrastructure (e.g., an architecture of data center 108).

In system architecture 100, deployed infrastructure (e.g., deployed infrastructure of data center 108) can be managed by cloud management 102, and in some examples, a customer can be billed according to the resources that the customer utilizes (which can be referred to as, pay as you go). In such examples, the customer can avoid allocating an information technology (IT) team to manage the infrastructure.

In some examples, system architecture 100 involves deploying a full data center (e.g., data center 108), where the data center is entirely managed by cloud management 102, and where the data center is targeted for a virtualized workload.

That is, system architecture 100 can involve a DCaaS where the data center is under cloud management 102 management (e.g., the customer does not provide infrastructure). Virtualized infrastructure (e.g., virtualization and overlay networking 112) can comprise a hypervisor on which the customer allocates virtual workloads (e.g., customer workload 110), which can be an IaaS implementation. That is, a full IaaS data center can be deployed as a service, and referred to as IaaSaaS.

Given those considerations, system architecture 100 can deploy an IaaS data center as a service. System architecture 100 can target a data center that is optimized for virtualized workloads on customer premises or a hosting facility. The customer can provide high-level resource definitions (e.g., intent-based provisioning) and service level agreements (SLAs) for a data center to cloud management 102. From this information, cloud management 102 can derive a data center hardware definition. Hardware corresponding to this hardware definition can be shipped to customer premise, or shipped to or allocated on a hosting site. When the hardware is shipped and ready, cloud management 102 can configure the hardware and networking, and then deploy and configure a virtualization stack on the hardware. In some examples, the hardware can be shipped, wired, deployed, and then configured. In other examples, the hardware can be pre-wired, pre-deployed, pre-configured, and then shipped. For example, one or more racks of hardware can be wired and connected, have a stack deployed on the hardware, and then the racks of hardware can be shipped. Once the racks of hardware are received at a destination, they can be connected to power and an external network and begin operations.

A data center can comprise storage (e.g., storage 116). A data center can also comprise compute (e.g., compute 118), which can comprise servers that lack (or do not utilize) local storage and are configured to boot from and store their data to storage 116. Booting can be implemented via technologies such as a preboot execution environment (PXE) book, or a network boot. The devices that the compute boots from can be configured by cloud management 102 as part of hardware and networking configuration. A data center can also comprise secondary storage (e.g., secondary storage 120). In some examples, there can be multiple instances of each of these components, and multiple different hardware models of each component can be deployed within a data center.

In some examples, local storage can be omitted from compute servers to facilitate maintenance. In such a system architecture, server hardware can be added or replaced and booted from the storage, without maintaining data on the server itself. Additionally, using a common boot device for virtual infrastructure can facilitate easier upgrades and configuration. Then, data protection can be facilitated by using such a system architecture.

Virtualization and overlay networking 112 can comprise the following to support data protection and mobility use cases. Virtualization and overlay networking 112 can comprise virtualized overlay networking (which virtualizes underlying network resources to components that operate on top of the virtual overlay network), and storage that is configured to spoof or virtualize volume identifiers (such as world wide names (WWNs)).

Where cloud management 102 manages the deployment and configuration of a data center, cloud management 102 can have information about the data center and the customer that cloud management 102 can use to manage the data center. This information can include customer infrastructure services information; ordered, deployed, and in-use resources; a customer's physical location; and customer SLAs.

System architecture 100 comprises cloud management 102, data centers 106, and communications network 122.

In turn, cloud management 102 comprises standby data center component 104. Data centers 106 comprises a plurality of data centers, including data center 108. Data center 108 comprises customer workload 110, virtualization and overlay networking 112, and infrastructure 114. Infrastructure 114 comprises storage 116, compute 118, and secondary storage 120.

Figure 12:
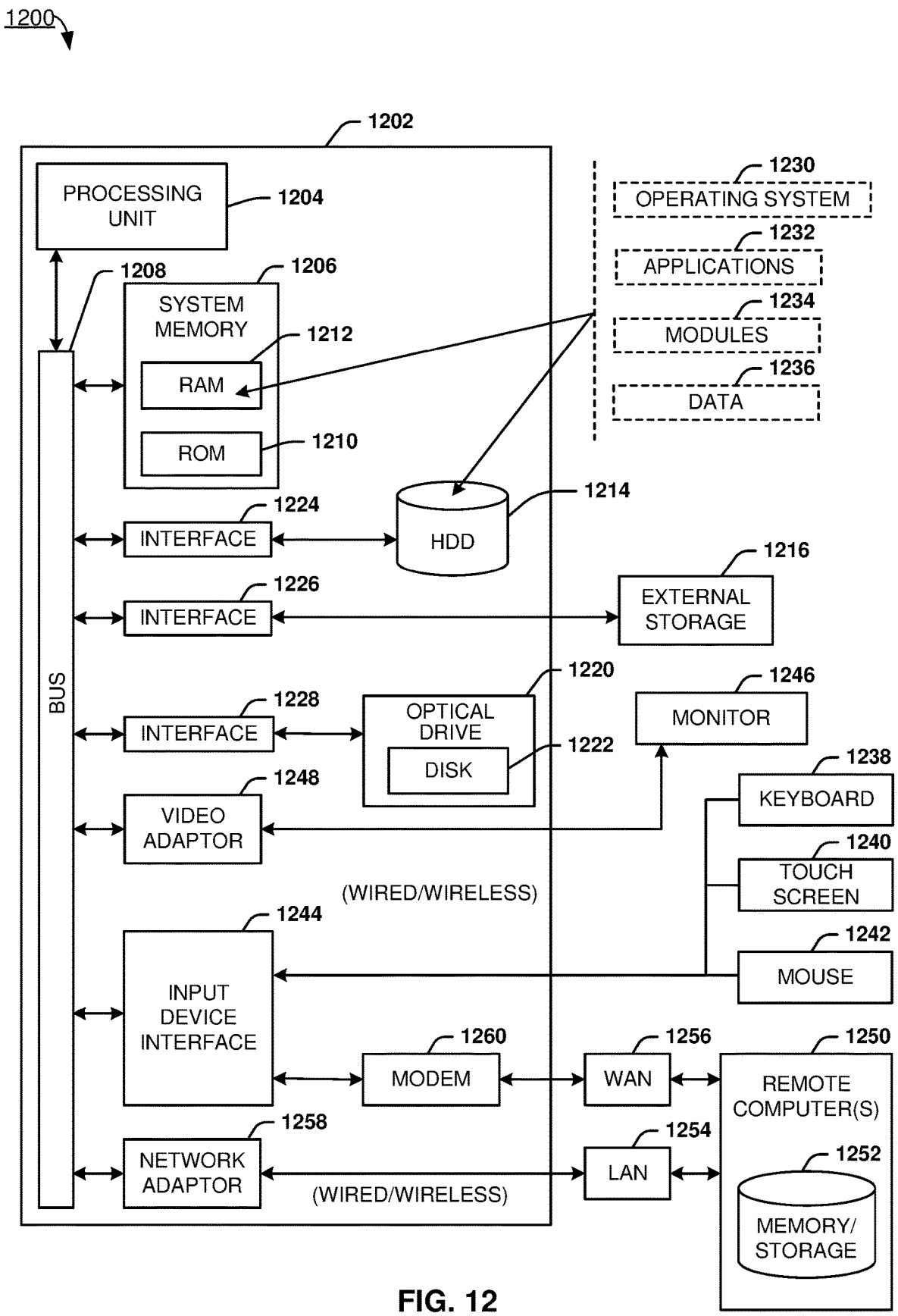
FIG. 12 illustrates an example block diagram of a computer operable to execute an embodiment of this disclosure.

Each of cloud management 102, data centers 106, and data center 108 can be implemented with part(s) of computing environment 1200 of FIG. 12. Communications network 122 can comprise a computer communications network, such as the INTERNET.

Cloud management 102 can communicate with data centers 106 and data center 108 via communications network 122 to manage data centers 106 and data center 108. In managing a data center, cloud management 102 can perform functions such as provisioning and managing virtualization and overlay networking 112, and infrastructure 114, and running customer workload 110 on data center 108.

Standby data center component 104 of cloud management 102 can manage data centers 106 and data center 108 by pre-provisioning a standby data center for data center 108, and restoring or migrating to that standby data center. Pre-provisioning a standby data center can comprise using information about the data center (e.g., how virtualization and overlay networking is set up) to set up part(s) of that data center (e.g., as in the system architectures of FIGS. 5-8) as another data center to serve as a backup. In effectuating a standby data center as a service, standby data center component 104 can implement part(s) of the operating procedures of FIGS. 9-11.

Customer workload 110 can comprise workloads provided by a customer of data center 108 that operate on data center 108. Customer workload 110 can comprise a virtualized workload—e.g., a virtual machine on which customer components operate, and where the virtual machine operates on top of virtualization and overlay networking 112.

Virtualization and overlay networking 112 can comprise virtualization management component (e.g., a hypervisor) that supports the execution of customer workload 110. Virtualization and overlay networking 112 can also comprise storage virtualization. In some examples, the virtualization management can comprise management for virtual machine-based virtualization, for container-based virtualization, for other types of virtualization, or for a combination of types of virtualization.

Infrastructure 114 can comprise computer hardware of data center 108. Storage 116 can comprise storage devices upon which computer data can be stored. Compute 118 can comprise one or more servers that process data stored on storage 116. In some examples, compute 118 omits using its own local storage, and instead uses storage 116 for storage. This separation of compute and storage hardware can facilitate managing a data center, as well as restoring a data center. Secondary storage 120 can be similar hardware to storage 116. Where storage 116 is used by compute 118, secondary storage can be used for backup and staging of data, such as to store a snapshot of storage 116, or to store data send from cloud management 102 in the course of managing data center 108.

Figure 2:
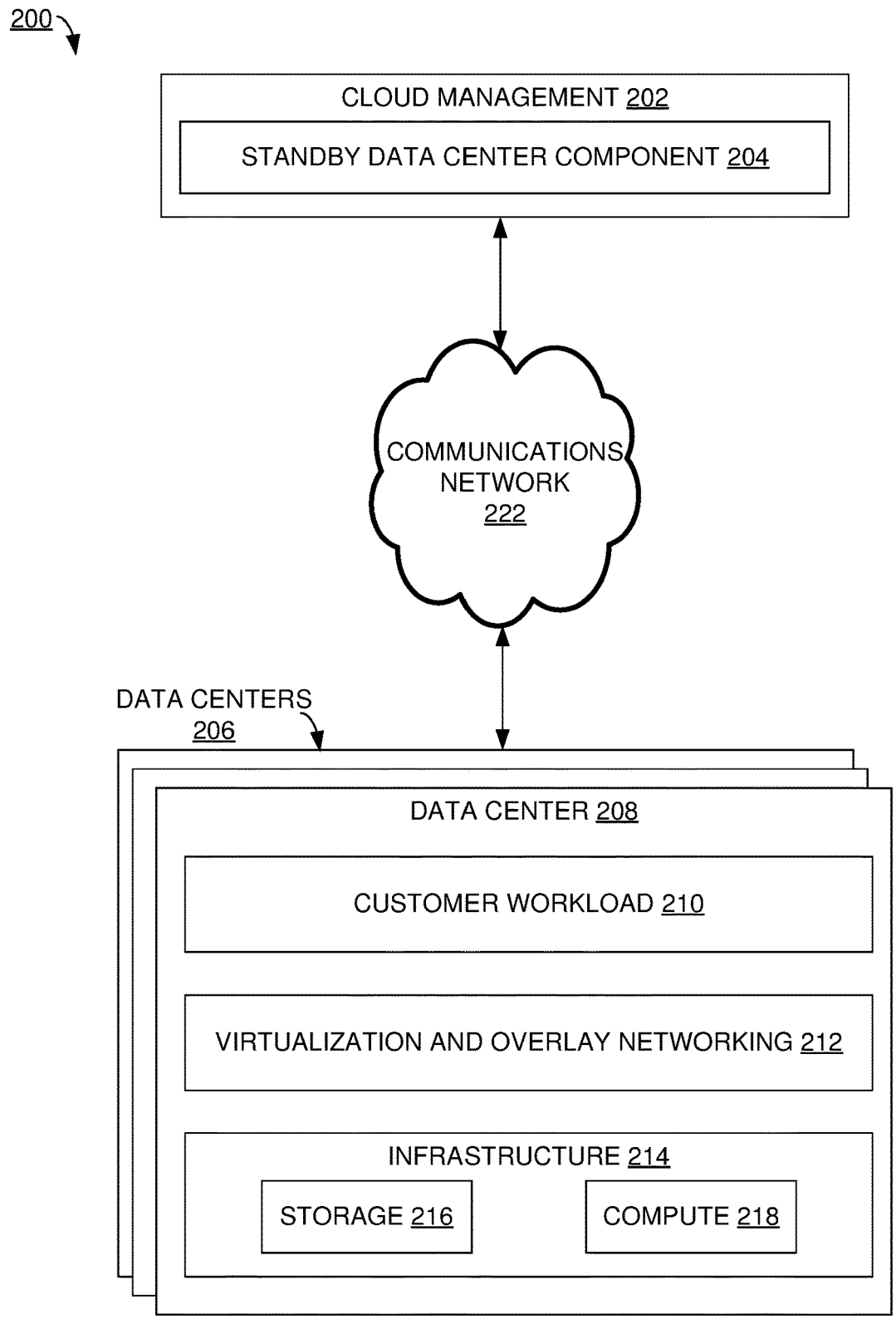
FIG. 2 illustrates another example system architecture that can facilitate a standby data center as a service, in accordance with an embodiment of this disclosure.

FIG. 2 illustrates another example system architecture 200 that can facilitate a standby data center as a service, in accordance with an embodiment of this disclosure.

System architecture 200 comprises cloud management 202, data centers 206, and communications network 222 (which can be similar to cloud management 102, data centers 106, and communications network 122 of FIG. 1, respectively).

In turn, cloud management 202 comprises standby data center component 204 (which can be similar to standby data center component 104). Data centers 206 comprises a plurality of data centers, including data center 208 (which can be similar to data center 108). Data center 208 comprises customer workload 210, virtualization and overlay networking 212, and infrastructure 214 (which can be similar to customer workload 110, virtualization and overlay networking 112, and infrastructure 114, respectively). Infrastructure 214 comprises storage 216 and compute 218 (which can be similar to storage 116 and compute 118, respectively).

A difference between system architecture 200 and system architecture 100 can be that system architecture 200 lacks secondary storage in data center 208 while system architecture 100 has secondary storage 120 in data center 108. Despite this difference, system architecture 200 and system architecture 100 can still each be implemented to facilitate data center restoration.

Figure 3:
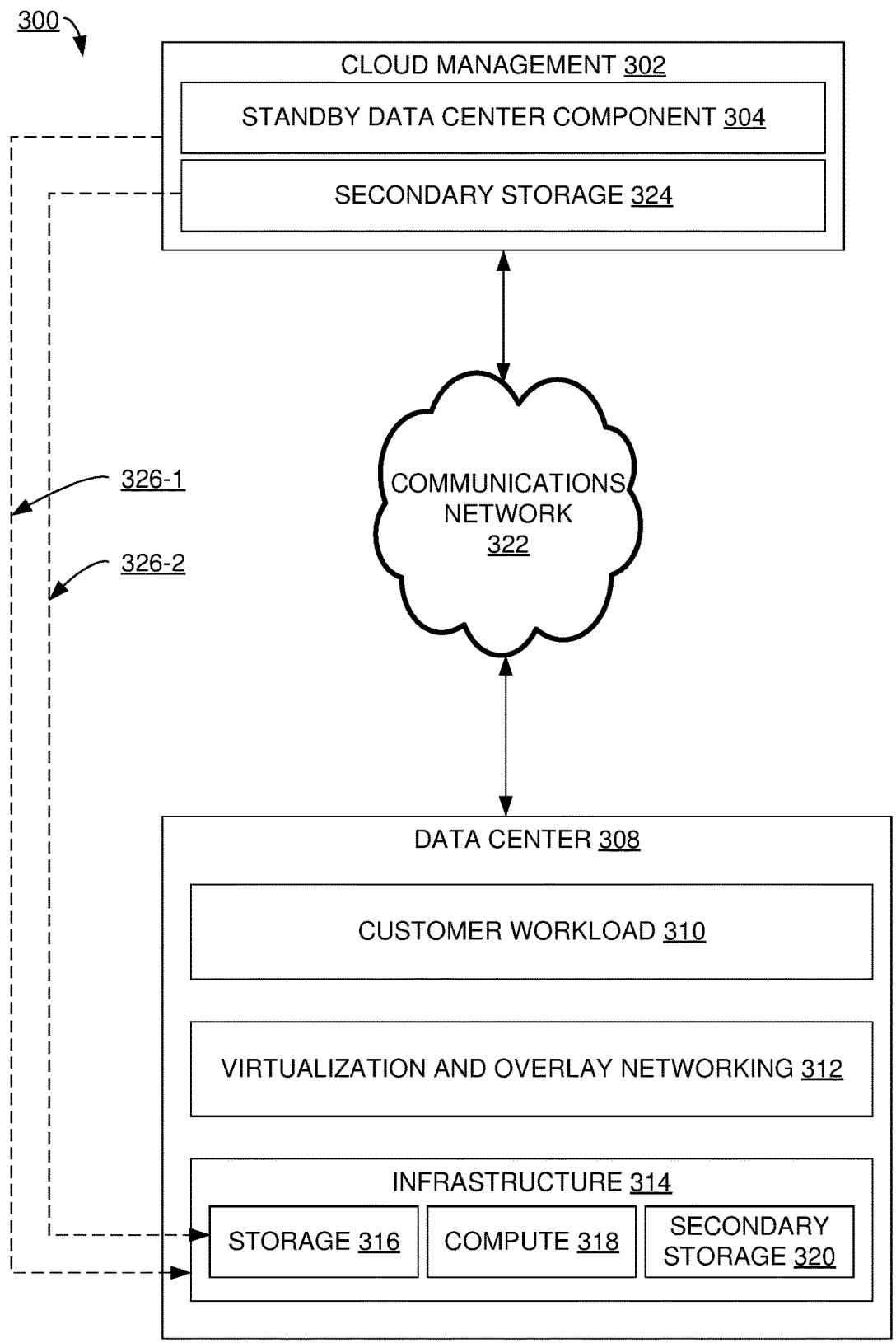
FIG. 3 illustrates an example system architecture that provisions a standby data center, and that can facilitate a standby data center as a service, in accordance with an embodiment of this disclosure.

FIG. 3 illustrates an example system architecture 300 that provisions a standby data center, and that can facilitate a standby data center as a service, in accordance with an embodiment of this disclosure.

System architecture 300 comprises cloud management 302, data center 308, and communications network 322 (which can be similar to cloud management 102, data center 108, and communications network 122 of FIG. 1, respectively).

In turn, cloud management 302 comprises standby data center component 304 (which can be similar to standby data center component 104), and secondary storage 324 (which can be similar to secondary storage 120). Data center 308 (which can be similar to data center 108) comprises customer workload 310, virtualization and overlay networking 312, and infrastructure 314 (which can be similar to customer workload 110, virtualization and overlay networking 112, and infrastructure 114, respectively). Infrastructure 314 comprises storage 316, compute 318, and secondary storage 320 (which can be similar to storage 116, compute 118, and secondary storage 120, respectively).

Implementing a standby data center, as in system architecture 300, can be way to significantly reduce a restore recovery time objective (RTO). There can be an SLA/service-cost trade-off that can provide better RTO for higher cost, by pre-creating and pre-populating parts of a restore target data center (e.g., data center 308) well before the restore operation. In some examples, cloud management 302 can receive preference data from a user of data center 308, and then manage the standby data center and orchestrate the restore operation according to that expressed preference of how much of the data center to pre-provision.

A standby data center (e.g., data center 308) can be a passive provisioned data center that can be used as a target for a restore. A use case of a standby data center can be in a disaster recovery scenario. In a standard restore scenario to a new location, the full data center infrastructure and data can be restored from scratch. Some of these steps can take quite some time.

In contrast, a standby data center can execute workloads faster from a point at which a restore operation begins.

In an example, a standby data center can be implemented as follows. Customer infrastructure (e.g., infrastructure 314) can be pre-deployed in a recovery location (326-1). From time to time, this infrastructure can have resources deployed or updated as the customer main data center (e.g., a data center from which a restore is being performed) evolves. Storage (e.g., storage 316) can be on-going populated with a latest backup (326-2). At a restore time (e.g., when data center 308 goes live), the data center can be ready to go live, or a latest update can be applied before the system is ready. That is, it can be that the system is ready with a latest backup and can be powered up.

A standby implementation can be performed similar to a restore, with operations being performed at different times (e.g., with a standby, some operations can be performed prior to determining to activate the target data center, and with a restore, operations can be performed after determining to restore a data center).

A standby data center can be implemented with a variety of SLA levels. Example SLA levels include nothing being pre-deployed (e.g., system architecture 500 of FIG. 5); only secondary storage (e.g., secondary storage 320) being pre-deployed and pre-filled (e.g., system architecture 600 of FIG. 6); storage (e.g., storage 316) being pre-deployed and filled (e.g., system architecture 700 of FIG. 7); and all infrastructure (e.g., infrastructure 314) and storage being pre-deployed (e.g., system architecture 300, as well as system architecture 800 of FIG. 8).

Maintaining a standby data center can cost money, and there can be the following cost considerations. In a scenario, compute (e.g., compute 318) and other hardware components (e.g., of infrastructure 314) can be powered off (meaning that a virtualization layer (e.g., virtualization and overlay networking 312) is likewise inactive). A cost model for this scenario can involve a lower charge for maintenance as the system is not fully active.

In a scenario, a standby data center immediate needs can be the equivalent resources that are in use on a primary data center. A customer can have ordered more resources and can have additional spare resources deployed in a primary data center, but a restore can be done on the used resources (rather than a larger amount of ordered resources).

In a scenario, if a standby data center is not on customer premises, but colocated or in the cloud, some hardware resources of the standby data center can be shared (or over-provisioned) between customers to reduce a cost associated with providing hardware resources to customers. For example, compute can be pooled and allocated to a customer data center upon restore. In another example, storage systems can be pooled where they are not pre-filled.

Figure 4:
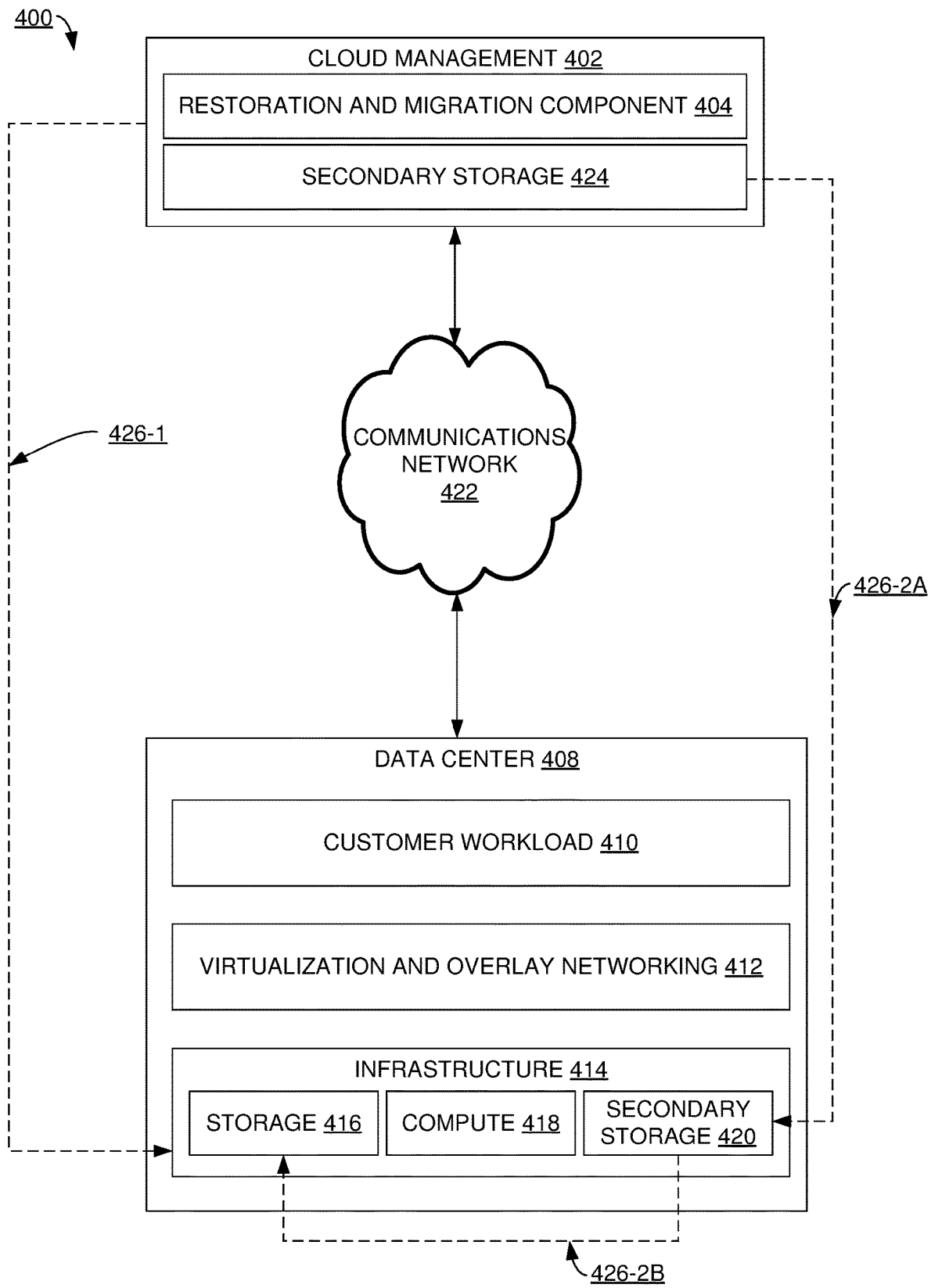
FIG. 4 illustrates another example system architecture that provisions a standby data center, and that can facilitate a standby data center as a service, in accordance with an embodiment of this disclosure.

FIG. 4 illustrates another example system architecture 400 that provisions a standby data center, and that can facilitate a standby data center as a service, in accordance with an embodiment of this disclosure.

System architecture 400 comprises cloud management 402, data center 408, and communications network 422 (which can be similar to cloud management 102, data center 108, and communications network 122 of FIG. 1, respectively).

In turn, cloud management 402 comprises standby data center component 404 (which can be similar to standby data center component 104), and secondary storage 424 (which can be similar to secondary storage 120). Data center 408 (which can be similar to data center 108) comprises customer workload 410, virtualization and overlay networking 412, and infrastructure 414 (which can be similar to customer workload 110, virtualization and overlay networking 112, and infrastructure 114, respectively). Infrastructure 414 comprises storage 416, compute 418, and secondary storage 420 (which can be similar to storage 116, compute 118, and secondary storage 120, respectively).

Infrastructure (e.g., infrastructure 414) can be pre-deployed (426-1, which can be similar to 326-1 of FIG. 3). Then, in contrast to system architecture 300 of FIG. 3, in system architecture 400, data can first be transferred to secondary storage 420 (426-2A), and then transferred from secondary storage 420 to storage 416 (426-2B).

Figure 5:
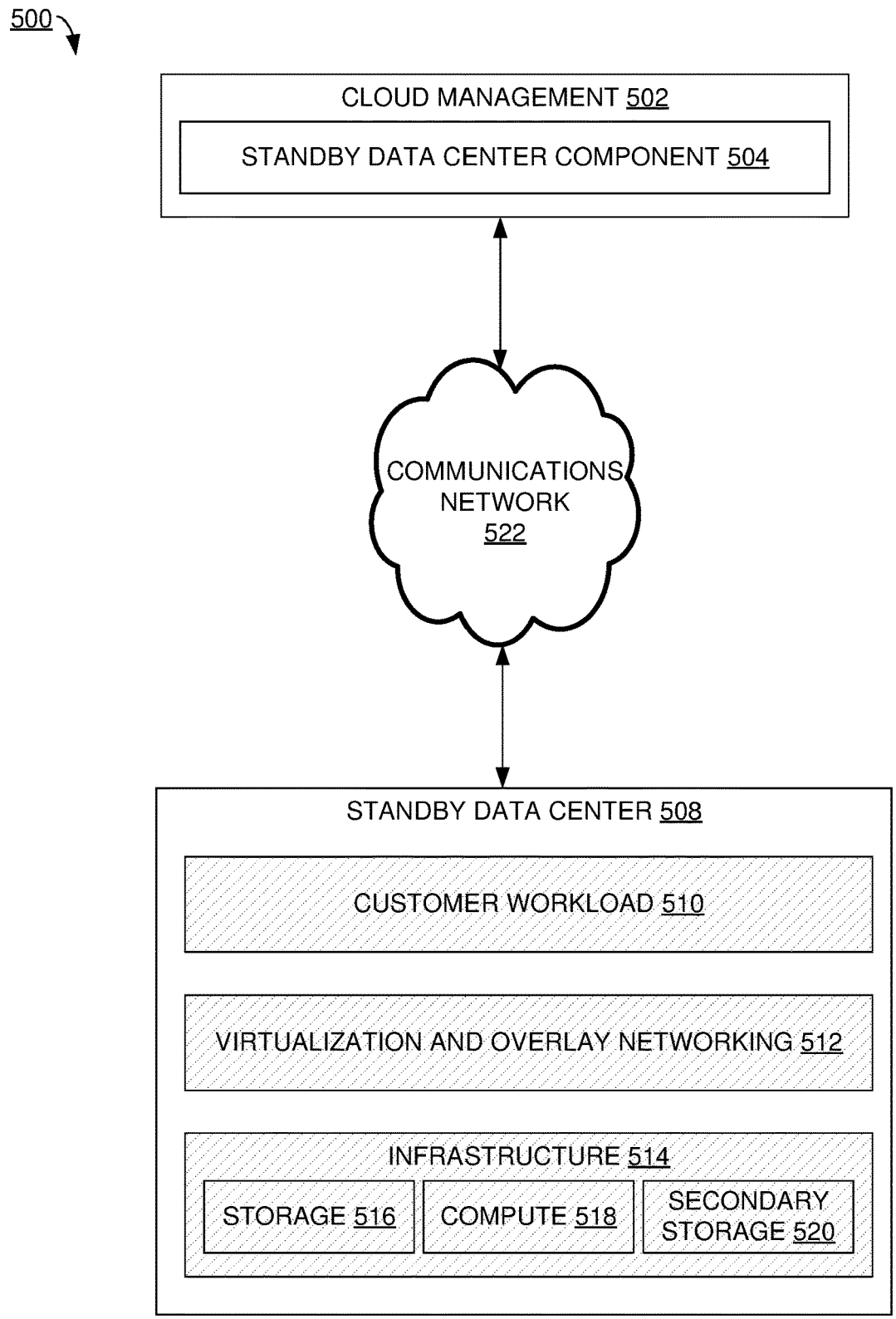
FIG. 5 illustrates an example system architecture for a standby data center as a service according to a first service level, in accordance with an embodiment of this disclosure.

FIG. 5 illustrates an example system architecture 500 for a standby data center as a service according to a first service level, in accordance with an embodiment of this disclosure.

System architecture 500 comprises cloud management 502, standby data center 508, and communications network 522 (which can be similar to cloud management 102, data center 108, and communications network 122 of FIG. 1, respectively).

In turn, cloud management 502 comprises standby data center component 504 (which can be similar to standby data center component 104). Standby data center 508 (which can be similar to data center 108) comprises customer workload 510, virtualization and overlay networking 512, and infrastructure 514 (which can be similar to customer workload 110, virtualization and overlay networking 112, and infrastructure 114, respectively). Infrastructure 514 comprises storage 516, compute 518, and secondary storage 520 (which can be similar to storage 116, compute 118, and secondary storage 120, respectively).

In system architecture 500, cloud management 502 establishes standby data center 508. A first service level agreement is to pre-deploy nothing. This is depicted in system architecture 500 by infrastructure 514, virtualization and overlay networking 512, and customer workload 510 being greyed out. When standby data center 508 is put into use to execute customer workloads, cloud management 502 can deploy infrastructure 514, virtualization and overlay networking 512, and customer workload 510.

Figure 6:
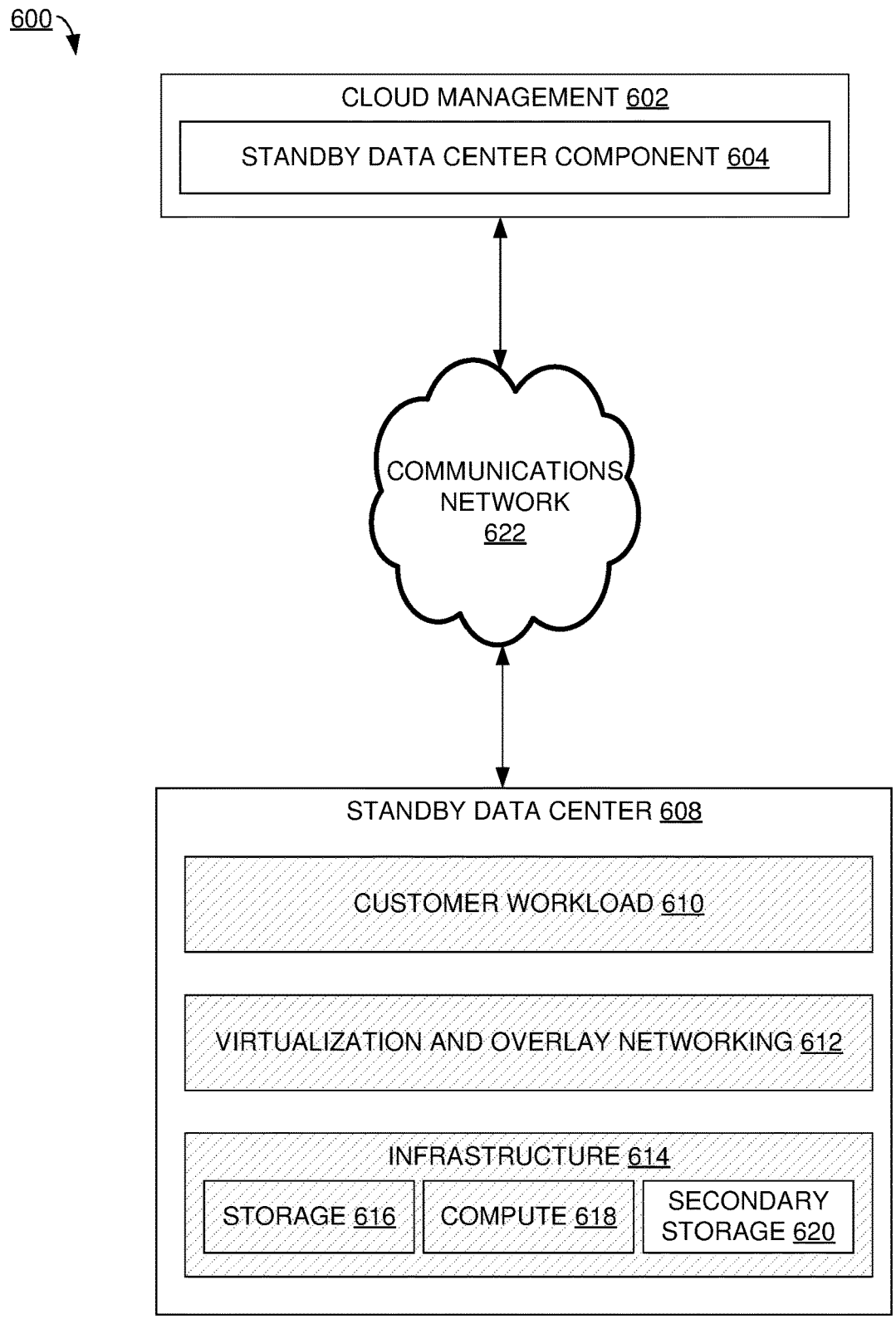
FIG. 6 illustrates an example system architecture for a standby data center as a service according to a second service level, in accordance with an embodiment of this disclosure.
Figure 7:
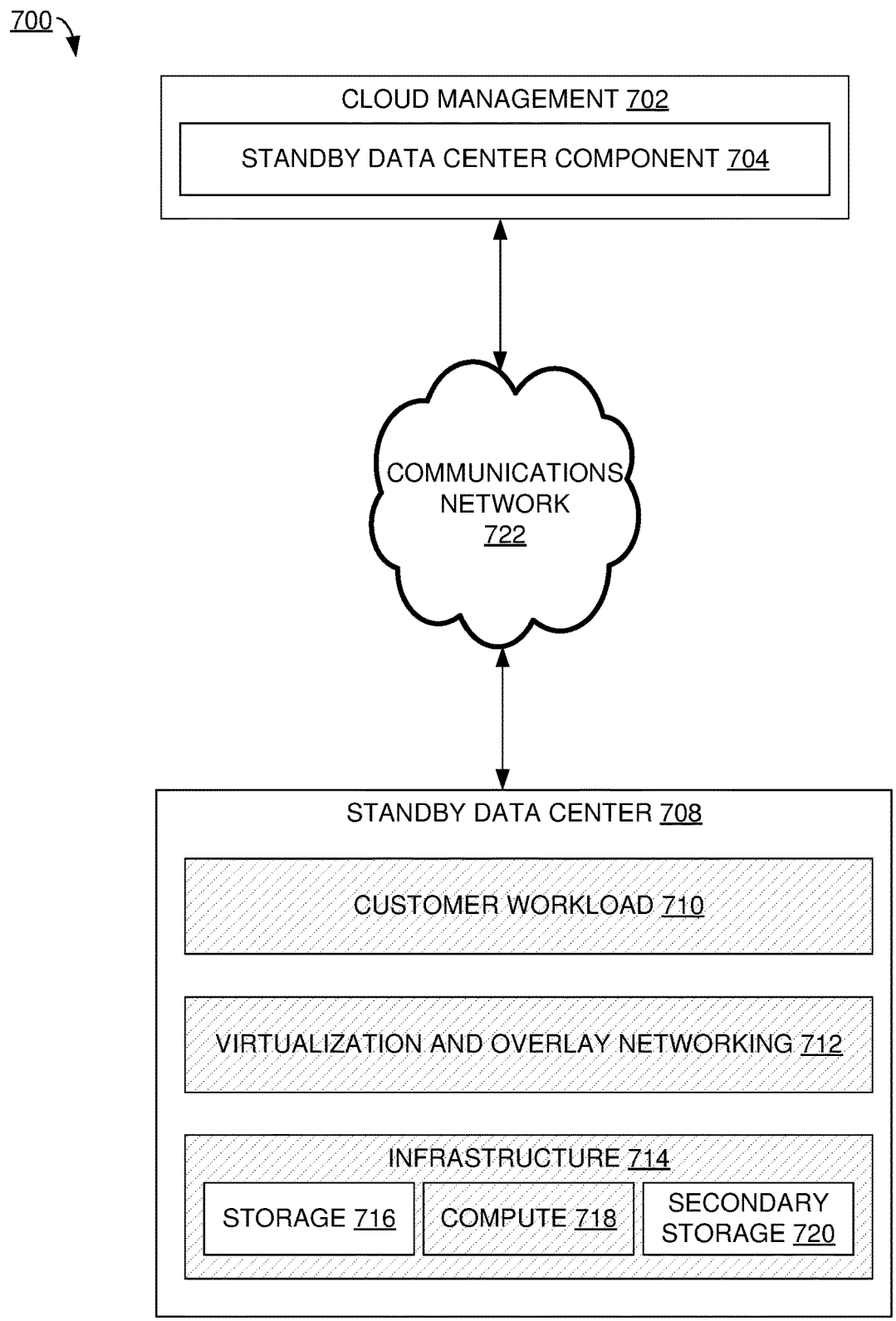
FIG. 7 illustrates an example system architecture for a standby data center as a service according to a third service level, in accordance with an embodiment of this disclosure.
Figure 8:
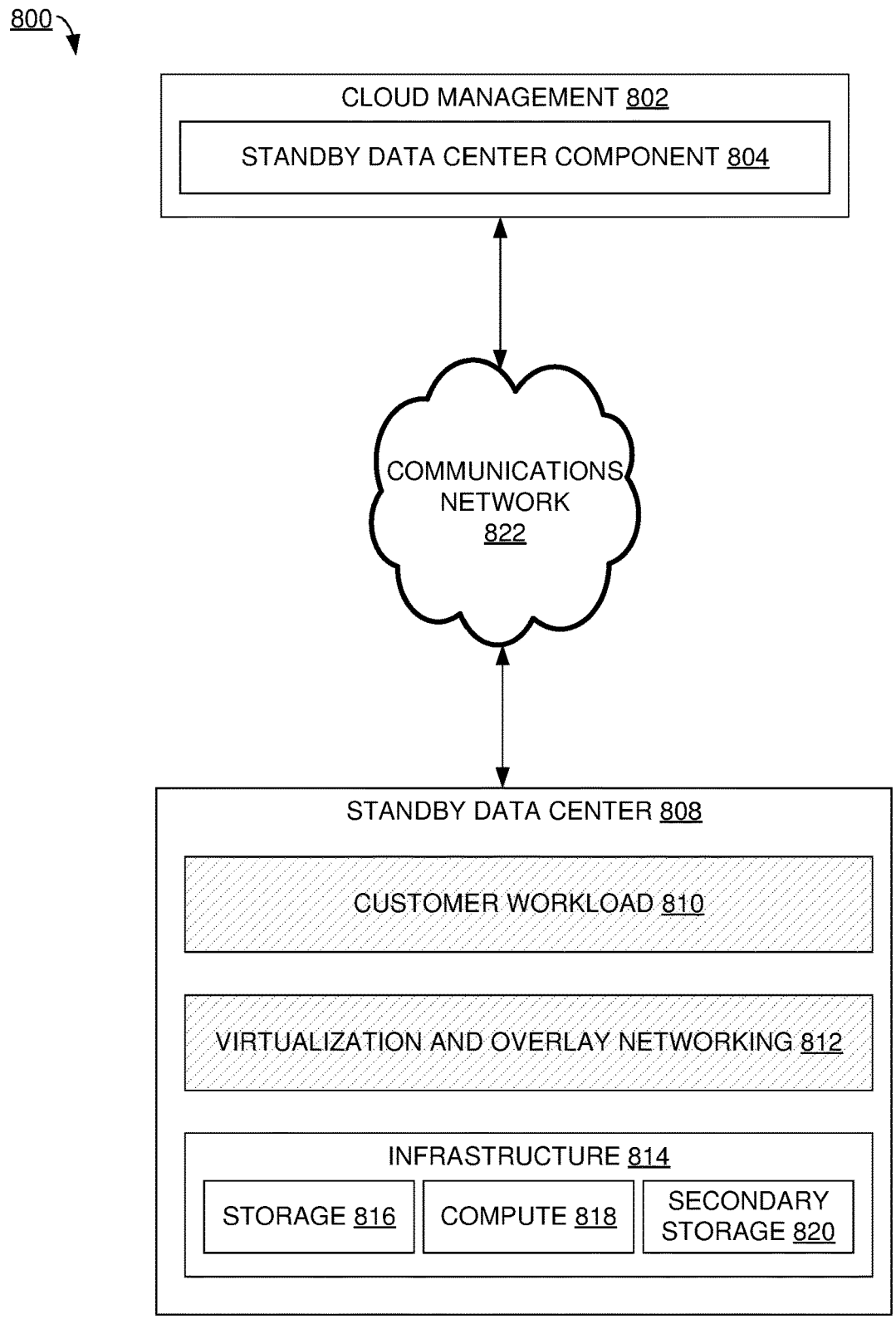
FIG. 8 illustrates an example system architecture for a standby data center as a service according to a fourth service level, in accordance with an embodiment of this disclosure.

This can result in a longer time passing between determining to put standby data center 508 into use and that happening compared to the system architectures of FIGS. 6-8.

FIG. 6 illustrates an example system architecture 600 for a standby data center as a service according to a second service level, in accordance with an embodiment of this disclosure.

System architecture 600 comprises cloud management 602, standby data center 608, and communications network 622 (which can be similar to cloud management 102, data centers 106, and communications network 122 of FIG. 1, respectively).

In turn, cloud management 602 comprises standby data center component 604 (which can be similar to standby data center component 104). Standby data center 608 (which can be similar to data center 108) comprises customer workload 610, virtualization and overlay networking 612, and infrastructure 614 (which can be similar to customer workload 110, virtualization and overlay networking 112, and infrastructure 114, respectively). Infrastructure 614 comprises storage 616, compute 618, and secondary storage 620 (which can be similar to storage 116, compute 118, and secondary storage 120, respectively).

In system architecture 600, cloud management 602 establishes standby data center 608. A second service level agreement is to pre-deploy data in secondary storage 620. This is depicted in system architecture 600 by infrastructure 614 (save for secondary storage 620), virtualization and overlay networking 612, and customer workload 610 being greyed out. When standby data center 608 is put into use to execute customer workloads, cloud management 602 can deploy infrastructure 614 (including copying data from secondary storage 620 to storage 616, as well as possibly uploading data from the origin data center to storage 616 that was modified since data was copied from the origin data center to secondary storage 620), virtualization and overlay networking 612, and customer workload 610.

This can result in a longer time passing between determining to put standby data center 608 into use and that happening compared to the system architectures of FIGS. 7-8, and a shorter time passing compared to the system architecture of FIG. 5.

FIG. 7 illustrates an example system architecture 700 for a standby data center as a service according to a third service level, in accordance with an embodiment of this disclosure.

System architecture 700 comprises cloud management 702, standby data center 708, and communications network 722 (which can be similar to cloud management 102, data centers 106, and communications network 122 of FIG. 1, respectively).

In turn, cloud management 702 comprises standby data center component 704 (which can be similar to standby data center component 104). Standby data center 708 (which can be similar to data center 108) comprises customer workload 710, virtualization and overlay networking 712, and infrastructure 714 (which can be similar to customer workload 110, virtualization and overlay networking 112, and infrastructure 114, respectively). Infrastructure 714 comprises storage 716, compute 718, and secondary storage 720 (which can be similar to storage 116, compute 118, and secondary storage 120, respectively).

In system architecture 700, cloud management 702 establishes standby data center 708. A third service level agreement is to pre-deploy data in storage 716. This is depicted in system architecture 700 by infrastructure 714 (save for storage 716 and secondary storage 720), virtualization and overlay networking 712, and customer workload 710 being greyed out. When standby data center 708 is put into use to execute customer workloads, cloud management 702 can deploy a remainder of infrastructure 714, virtualization and overlay networking 712, and customer workload 710.

This can result in a longer time passing between determining to put standby data center 708 into use and that happening compared to the system architectures of FIG. 8, and a shorter time passing compared to the system architecture of FIGS. 5-6.

FIG. 8 illustrates an example system architecture 800 for a standby data center as a service according to a fourth service level, in accordance with an embodiment of this disclosure.

System architecture 800 comprises cloud management 802, standby data center 808, and communications network 822 (which can be similar to cloud management 102, data centers 106, and communications network 122 of FIG. 1, respectively).

In turn, cloud management 802 comprises standby data center component 804 (which can be similar to standby data center component 104). Standby data center 808 (which can be similar to data center 108) comprises customer workload 810, virtualization and overlay networking 812, and infrastructure 814 (which can be similar to customer workload 110, virtualization and overlay networking 112, and infrastructure 114, respectively). Infrastructure 814 comprises storage 816, compute 818, and secondary storage 820

(which can be similar to storage 116, compute 118, and secondary storage 120, respectively).

In system 700, cloud management 702 establishes standby data center 708. A fourth service level agreement is to pre-deploy infrastructure 714. This is depicted in system architecture 700 virtualization and overlay networking 712, and customer workload 710 being greyed out. When standby data center 708 is put into use to execute customer workloads, cloud management 702 can deploy virtualization and overlay networking 712, and customer workload 710.

This can result in a shorter time passing between determining to put standby data center 708 into use and that happening compared to the system architectures of FIGS. 5-7.

Example Process Flows

FIG. 9 illustrates another example process flow for a standby data center as a service, and that can facilitate data center restoration, in accordance with an embodiment of this disclosure. In some examples, one or more embodiments of process flow 900 can be implemented by standby data center component 104 of FIG. 1, standby data center component 204 of FIG. 2, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1000 of FIG. 10, and/or process flow 1100 of FIG. 11.

Process flow 900 begins with 902, and moves to operation 904. Operation 904 depicts maintaining a first data center that comprises a first instance of a virtualized overlay network that virtualizes physical network resources and a first instance of a group of virtualized volume identifiers that virtualize physical storage volumes, the first data center storing data comprising first instances of a group of virtualized workloads that operate on the first data center. The first data center can be similar to data center 108 of FIG. 1.

After operation 904, process flow 900 moves to operation 906.

Operation 906 depicts determining a service level agreement associated with providing a second data center as a backup to the first data center. The SLA can be similar to a SLA described with respect to one of FIGS. 5-8.

After operation 906, process flow 900 moves to operation 908.

Operation 908 depicts, based on the service level agreement, dividing, into a first portion of tasks and a second portion of tasks: deploying the data to a secondary storage of the second data center, deploying the data to a primary storage of the second data center, and configuring the second data center with a second instance of the virtualized overlay network and a second instance of the group of virtualized volume identifiers. That is, based on the SLA of operation 906, a determination can be made as to which parts of a standby data center to provision before a restore, and which parts of the standby data center to provision after the restore.

In some examples, operation 908 comprises dividing the deploying of the data to the secondary storage of the second data center in the first portion of tasks, the deploying of the data to the primary storage of the second data center, and the configuring of the second data center with the second instance of the virtualized overlay network and the second instance of the group of virtualized volume identifiers in the second portion of tasks. That is, the example of system architecture 600 of FIG. 6 can be implemented, where data is stored in secondary storage 620 ahead of a restore, and then data is stored in storage 616 and infrastructure 614 is configured at a time of restoration.

In some examples, operation 908 comprises dividing the deploying of the data to the primary storage of the second data center in the first portion of tasks, and the configuring of the second data center with the second instance of the virtualized overlay network and the second instance of the group of virtualized volume identifiers in the second portion of tasks. That is, the example of system architecture 700 of FIG. 7 can be implemented, where data is stored in storage 716 ahead of a restore, and infrastructure 714 is configured at a time of restoration.

In some examples, operation 908 comprises, in response to determining to restore the first data center to the second data center, determining to provision a first amount of resources for the second data center that corresponds to a used amount of resources of the first data center, wherein the used amount of resources is less than an ordered amount of resources of the first data center. That is, a customer can be using fewer resources at a primary data center than were ordered. In such examples, a standby data center can be initially provisioned with an amount of resources that the customer is using at the primary data center, since that amount of resources is sufficient to support the customer's current workloads.

After operation 908, process flow 900 moves to operation 910.

Operation 910 depicts performing the first portion of tasks before determining to restore the first data center to the second data center. That can comprise, e.g., filling secondary storage 620 of FIG. 6 with data, filling storage 716 of FIG. 7 with data, or pre-provisioning infrastructure 814 of FIG. 8.

In some examples, operation 910 comprises repeatedly populating the primary storage or the secondary storage with updated data from the first data center before determining to restore the first data center to the second data center. That is, a primary data center for which a standby data center is being configured can have its data change over time. As the primary data center's data changes, and where the standby data center pre-populates data in storage or secondary storage, this updated data can be stored in the secondary data center to keep the secondary data center current.

After operation 910, process flow 900 moves to operation 912.

Operation 912 depicts performing the second portion of tasks in response to determining to restore the first data center to the second data center. Using the example of system architecture 800 of FIG. 8, this can comprise configuring and starting virtualization and overlay networking 812 and customer workload 810.

In some examples, the second data center comprises compute components, and operation 912 comprises powering on the compute components in response to determining to restore the first data center to the second data center. That is, certain hardware of a data center can be powered on when a restore occurs. In some examples, a first charge is associated with maintaining the compute components as powered off, wherein a second charge is associated with maintaining the compute components as powered on, and wherein the first charge is less than the second charge. That is, it can be cheaper for both a provider of a standby data center and a customer where certain compute components are not powered on until a time of restoration.

After operation 912, process flow 900 moves to 914, where process flow 900 ends.

FIG. 10 illustrates another example process flow for a standby data center as a service, and that can facilitate data center restoration, in accordance with an embodiment of this disclosure. In some examples, one or more embodiments of process flow 1000 can be implemented by standby data center component 104 of FIG. 1, standby data center component 204 of FIG. 2, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9, and/or process flow 1100 of FIG. 11.

Process flow 1000 begins with 1002, and moves to operation 1004. Operation 1004 depicts maintaining a first data center that comprises a first instance of a virtualized overlay network that abstracts physical network resources and a first instance of a group of virtualized volume identifiers that abstract physical storage volumes, the first data center storing data comprising first instances of a group of virtualized workloads that operate on the first data center. In some examples, operation 1004 can be implemented in a similar manner as operation 904 of FIG. 9.

After operation 1004, process flow 1000 moves to operation 1006.

Operation 1006 depicts determining a service level agreement associated with providing a second data center as a backup to the first data center. In some examples, operation 1006 can be implemented in a similar manner as operation 906 of FIG. 9.

After operation 1006, process flow 1000 moves to operation 1008.

Operation 1008 depicts, based on the service level agreement, making a first determination of whether to perform deploying the data to a storage of the second data center before or after determining to restore the first data center to the second data center. In some examples, operation 1008 can be implemented in a similar manner as operation 908 of FIG. 9.

After operation 1008, process flow 1000 moves to operation 1010.

Operation 1010 depicts, based on the service level agreement, making a second determination of whether to perform configuring the second data center with a second instance of the virtualized overlay network and a second instance of the group of virtualized volume identifiers before or after determining to restore the first data center to the second data center. In some examples, operation 1010 can be implemented in a similar manner as operation 908 of FIG. 9.

After operation 1010, process flow 1000 moves to operation 1012.

Operation 1012 depicts deploying the data to the storage of the second data center before or after determining to restore the first data center to the second data center based on the first determination. In some examples, operation 1012 can be implemented in a similar manner as operations 910-912 of FIG. 9.

In some examples, operation 1012 comprises deploying the data to a secondary storage of the second data center before determining to restore the first data center to the second data center, and deploying the data to a primary storage of the second data center in response to determining to restore the first data center to the second data center. That is, an implementation similar to system architecture 400 of FIG. 4 (or system architecture 600 of FIG. 6) can be implemented, where data is pre-deployed to secondary storage 420, and then deployed from secondary storage 420 to storage 416 at a time of restoration.

After operation 1012, process flow 1000 moves to operation 1014.

Operation 1014 depicts configuring the second data center with the second instance of the virtualized overlay network and the second instance of the group of virtualized volume identifiers based on the second determination. In some examples, operation 1014 can be implemented in a similar manner as operations 910-912 of FIG. 9.

In some examples, operation 1014 is performed before determining to restore the first data center to the second data center, and can comprise, in response to determining that a configuration of the first data center has changed, updating the configuring of the second data center. That is, a standby data center can have its infrastructure (e.g., infrastructure 114 of FIG. 1) pre-configured. Where the primary data center's infrastructure configuration changes, this change can be implemented on the secondary data center, as well. In some examples, operation 1014 is performed before determining to restore the first data center to the second data center, and can comprise, in response to determining that a first amount of resources deployed at the first data center has changed by a first amount, changing, by the system, a second amount of resources deployed at the second data center by a second amount that corresponds to the first amount. That is, where an amount of resources used at a primary data center changes, the amount of resources used by the standby data center can be updated.

In some examples, operation 1014 comprises activating the second instance of the virtualized overlay network and the second instance of the group of virtualized volume identifiers in response to determining to restore the first data center to the second data center. That is, in a standby data center (e.g., data center 308 of FIG. 3), a virtualization layer (e.g., virtualization and overlay networking 312) can be activated when the standby data center is activated.

In some examples, a first charge is associated with maintaining the second instance of the virtualized overlay network and the second instance of the group of virtualized volume identifiers as inactive, a second charge is associated with maintaining the second instance of the virtualized overlay network and the second instance of the group of virtualized volume identifiers as active, the first charge is less than the second charge, and a cost value of a cost data structure is determined as a function of a first measure of inactivity of the second instance of the virtualized overlay network and the second instance of the group of virtualized volume identifiers, and a second measure of activity of the second instance of the virtualized overlay network and the second instance of the group of virtualized volume identifiers. That is, it can be cheaper (for a customer and/or a provider of a standby data center) to keep the virtualization layer inactive until a time at which the standby data center is activated, compared to keeping the virtualization layer active when the standby data center is inactive.

After operation 1014, process flow 1000 moves to 1016, where process flow 1000 ends.

FIG. 11 illustrates an example process flow for a standby data center as a service, and that can facilitate data center restoration and migration, in accordance with an embodiment of this disclosure. In some examples, one or more embodiments of process flow 1000 can be implemented by standby data center component 104 of FIG. 1, standby data center component 204 of FIG. 2, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 900 of FIG. 9, and/or process flow 1000 of FIG. 10.

Process flow 1100 begins with 1102, and moves to operation 1104. Operation 1104 depicts determining a service level agreement associated with providing a second data center as a backup to a first data center, wherein the first data center comprises a first instance of a virtualized overlay and a first instance of a group of virtualized volume identifiers that abstract physical storage volumes. In some examples, operation 1104 can be implemented in a similar manner as operation 906 of FIG. 9.

After operation 1104, process flow 1000 moves to operation 1106.

Operation 1106 depicts, based on the service level agreement, determining whether to pre-deploy at least part of the second data center, wherein pre-deploying the second data center comprises pre-deploying data of the first data center to a storage of the second data center and configuring the second data center with a second instance of the virtualized overlay network and a second instance of the group of virtualized volume identifiers. In some examples, operation 1106 can be implemented in a similar manner as operation 908 of FIG. 9.

In some examples, operation 1106 comprises, based on the service level agreement, determining to perform the deploying of the data of the first data center to the storage of the second data center and the configuring of the second data center with the second instance of the virtualized overlay network and the second instance of the group of virtualized volume identifiers after determining to restore the first data center to the second data center. That is, a scenario similar to system architecture 600 of FIG. 6 can be implemented, where nothing is pre-deployed.

In some examples, operation 1106 comprises, based on the service level agreement, determining to perform the deploying of the data of the first data center to the storage of the second data center and the configuring of the second data center with the second instance of the virtualized overlay network and the second instance of the group of virtualized volume identifiers before determining to restore the first data center to the second data center. That is, a scenario similar to system architecture 800 of FIG. 8 can be implemented, where infrastructure 814 is pre-deployed.

After operation 1106, process flow 1000 moves to operation 1108.

Operation 1108 depicts pre-deploying the second data center based on the determining indicating to pre-deploy at least the part of the second data center. In some examples, operation 1108 can be implemented in a similar manner as operation 910 of FIG. 9.

In some examples, operation 1108 comprises over-provisioning hardware resources of the second data center. In some examples, over-provisioning comprises maintaining a group of hardware for restorations of multiple data centers that comprises the first data center, and allocating at least a portion of the group of hardware to the first data center in response to determining to restore the first data center to the second data center. That is, certain computer or storage hardware can be assigned to multiple standby data centers, and then used in a first standby data center that is activated.

In some examples, over-provisioning comprises over-provisioning a first storage resource that is not pre-filled, determining to omit over-provisioning a second storage resource that is pre-filled. That is, it can be that storage that is pre-filled with customer data is not used in over-provisioning, and that other storage (that is not pre-filled) can be used in over-provisioning.

After operation 1108, process flow 1000 moves to operation 1110.

Operation 1110 depicts, after determining to restore the first data center to the second data center, performing a remainder of deploying the second data center remaining after at least the part of the second data center was pre-deployed. In some examples, operation 1110 can be implemented in a similar manner as operation 912 of FIG. 9.

After operation 1110, process flow 1000 moves to 1112, where process flow 1000 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of cloud management 102, data centers 106, and/or data center 108 of FIG. 1, and/or cloud management 202, data centers 206, and/or data center 208 of FIG. 2.

In some examples, computing environment 1200 can implement one or more embodiments of the process flows of FIGS. 9-11 to facilitate a standby data center as a service.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      maintaining a first data center that comprises a first instance of a virtualized overlay network that virtualizes physical network resources and a first instance of a group of virtualized volume identifiers that virtualize physical storage volumes, the first data center storing data comprising first instances of a group of virtualized workloads that operate on the first data center;
      determining a service level agreement associated with providing a second data center as a backup to the first data center;
      based on the service level agreement, dividing tasks into a first portion of tasks to complete before determining to restore the first data center to the second data center, and a second portion of tasks to perform after determining to restore the first data center and the second data center, wherein the tasks comprise,
         deploying the data to a secondary storage of the second data center,
         deploying the data to a primary storage of the second data center, and
         configuring the second data center with a second instance of the virtualized overlay network and a second instance of the group of virtualized volume identifiers;
      assigning the deploying of the data to the primary storage of the second data center to the first portion of tasks;
      assigning the configuring of the second data center with the second instance of the virtualized overlay network and the second instance of the group of virtualized volume identifiers to the second portion of tasks;

performing the first portion of tasks before determining to restore the first data center to the second data center; and performing the second portion of tasks in response to determining to restore the first data center to the second data center.

2. The system of claim 1, wherein the dividing of the tasks into the first portion of tasks and the second portion of tasks comprises:

assigning the deploying of the data to the secondary storage of the second data center to the first portion of tasks.

3. The system of claim 1, wherein the second data center comprises compute components, and wherein the operations further comprise:

powering on the compute components in response to determining to restore the first data center to the second data center.

4. The system of claim 3, wherein a first charge is associated with maintaining the compute components as powered off, wherein a second charge is associated with maintaining the compute components as powered on, and wherein the first charge is less than the second charge.

5. The system of claim 1, wherein the operations further comprise:

repeatedly populating the primary storage or the secondary storage with updated data from the first data center before determining to restore the first data center to the second data center.

6. The system of claim 1, wherein the operations further comprise:

in response to determining to restore the first data center to the second data center, determining to provision a first amount of resources for the second data center that corresponds to a used amount of resources of the first data center, wherein the used amount of resources is less than an ordered amount of resources of the first data center.

7. A method, comprising:

maintaining, by a system comprising at least one processor, a first data center that comprises a first instance of a virtualized overlay network that abstracts physical network resources and a first instance of a group of virtualized volume identifiers that abstract physical storage volumes, the first data center storing data comprising first instances of a group of virtualized workloads that operate on the first data center;

determining, by the system, a service level agreement associated with providing a second data center as a backup to the first data center;

based on the service level agreement, dividing, by the system, tasks into a first portion of tasks to complete before determining to restore the first data center to the second data center, and a second portion of tasks to perform after determining to restore the first data center and the second data center, wherein the tasks comprise, deploying the data to a secondary storage of the second data center, wherein the deploying of the data to a secondary storage is assigned to the first portion of tasks, deploying the data to a primary storage of the second data center, and configuring the second data center with a second instance of the virtualized overlay network and a second instance of the group of virtualized volume identifiers, wherein the configuring is assigned to the second portion of tasks;

performing the first portion of tasks before determining to restore the first data center to the second data center; and performing the second portion of tasks in response to determining to restore the first data center to the second data center.

8. The method of claim 7, wherein deploying the data to the storage of the second data center comprises:

deploying, by the system, the data to a primary storage of the second data center in response to determining to restore the first data center to the second data center.

9. The method of claim 7, wherein the operations further comprise:

in response to determining that a configuration of the first data center has changed, updating, by the system, the configuring of the second data center.

10. The method of claim 7, wherein the operations further comprise:

in response to determining that a first amount of resources deployed at the first data center has changed by a first amount, changing, by the system, a second amount of resources deployed at the second data center by a second amount that corresponds to the first amount.

11. The method of claim 7, further comprising:

activating, by the system, the second instance of the virtualized overlay network and the second instance of the group of virtualized volume identifiers in response to determining to restore the first data center to the second data center.

12. The method of claim 11, wherein a first charge is associated with maintaining the second instance of the virtualized overlay network and the second instance of the group of virtualized volume identifiers as inactive, wherein a second charge is associated with maintaining the second instance of the virtualized overlay network and the second instance of the group of virtualized volume identifiers as active, wherein the first charge is less than the second charge, and wherein a cost value of a cost data structure is determined as a function of a first measure of inactivity of the second instance of the virtualized overlay network and the second instance of the group of virtualized volume identifiers, and a second measure of activity of the second instance of the virtualized overlay network and the second instance of the group of virtualized volume identifiers.

13. The method of claim 7, wherein the service level agreement indicates a recovery time objective of restoring the first data center to the second data center.

14. A non-transitory computer-readable medium comprising instructions that, in response to execution, cause a system comprising at least one processor to perform operations, comprising:

determining a service level agreement associated with providing a second data center as a backup to a first data center, wherein the first data center comprises a first instance of a virtualized overlay and a first instance of a group of virtualized volume identifiers that abstract physical storage volumes;

based on the service level agreement, dividing, by the system, tasks into a first portion of tasks to complete before determining to restore the first data center to the second data center, and a second portion of tasks to perform after determining to restore the first data center and the second data center, wherein the dividing comprises, assigning deploying the data to a secondary storage of the second data center to the first portion of tasks, and assigning configuring the second data center with a second instance of the virtualized overlay network and a second instance of the group of virtualized volume identifiers to the second portion of tasks;

performing the first portion of tasks before determining to restore the first data center to the second data center; and performing the second portion of tasks in response to determining to restore the first data center to the second data center.

15. The non-transitory computer-readable medium of claim 14, wherein pre-deploying the second data center comprises:

over-provisioning hardware resources of the second data center.

16. The non-transitory computer-readable medium of claim 15, wherein the over-provisioning comprises:

maintaining a group of hardware for restorations of multiple data centers that comprises the first data center; and allocating at least a portion of the group of hardware to the first data center in response to determining to restore the first data center to the second data center.

17. The non-transitory computer-readable medium of claim 15, wherein the over-provisioning comprises:

over-provisioning a first storage resource that is not pre-filled; and determining to omit over-provisioning a second storage resource that is pre-filled.

18. The non-transitory computer-readable medium of claim 14, wherein the dividing of the tasks into the first portion of tasks and the second portion of tasks comprises:

assigning the deploying of the data to the secondary storage of the second data center to the first portion of tasks.

19. The non-transitory computer-readable medium of claim 14, wherein the second data center comprises compute components, and wherein the operations further comprise:

powering on the compute components in response to determining to restore the first data center to the second data center.

20. The non-transitory computer-readable medium of claim 19, wherein a first charge is associated with maintaining the compute components as powered off, wherein a second charge is associated with maintaining the compute components as powered on, and wherein the first charge is less than the second charge.

* * * * *